United States Patent
Darshan et al.

(10) Patent No.: US 12,346,414 B2
(45) Date of Patent: Jul. 1, 2025

(54) DISTRIBUTED DIGITAL RIGHTS MANAGEMENT (DRM) PROTECTION

(71) Applicant: Synamedia Limited, Staines Upon Thames (GB)

(72) Inventors: Ezra Darshan, Beit Shemesh (IL); Thomas Paul Burnley, Hampshire (GB)

(73) Assignee: SYNAMEDIA LIMITED, Maidenhead (GB)

( * ) Notice: Subject to any disclaimer, the term of this patent is extended or adjusted under 35 U.S.C. 154(b) by 224 days.

(21) Appl. No.: 17/945,690

(22) Filed: Sep. 15, 2022

(65) Prior Publication Data
US 2024/0095314 A1 Mar. 21, 2024

(51) Int. Cl.
G06F 21/10 (2013.01)
G06F 21/60 (2013.01)
H04L 9/08 (2006.01)

(52) U.S. Cl.
CPC .......... G06F 21/105 (2013.01); G06F 21/602 (2013.01); H04L 9/0877 (2013.01)

(58) Field of Classification Search
CPC ......... G06F 21/10; G06F 21/101–1015; G06F 21/105; G06F 21/107–1079; G06F 21/108–1088; G06F 21/602; G06F 21/62–629; H04L 9/0822–0827; H04L 63/0428–0478; H04L 2209/60–603; H04L 2463/101
See application file for complete search history.

(56) References Cited

U.S. PATENT DOCUMENTS

| | | | |
|---|---|---|---|
| 7,499,550 B2 | 3/2009 | Athaide et al. | |
| 8,194,859 B2 | 6/2012 | Wingert et al. | |
| 2002/0146122 A1* | 10/2002 | Vestergaard | H04L 65/1101 380/231 |
| 2003/0120611 A1* | 6/2003 | Yoshino | G06F 21/10 705/67 |

OTHER PUBLICATIONS

Extended European Search Report for corresponding EP Appl. 23190420.2 dated Mar. 6, 2024.

* cited by examiner

Primary Examiner — Kevin Bechtel
(74) Attorney, Agent, or Firm — Fernando & Partners, LLP (57) ABSTRACT

Various implementations include distributing DRM processing between a DRM key protection system and multiple receiving devices. To that end, a method includes receiving a first encrypted content key associated with a first receiving device, and receiving a second encrypted content key associated with a second receiving device. The method includes processing the first encrypted content key to generate a first decrypted content key, and processing the second encrypted content key to generate a second decrypted content key. The method includes generating a first protected content key based on the first decrypted content key, and generating a second protected content key based on the second decrypted content key. The method includes providing the first protected content key to the first receiving device, and providing the second protected content key to the second receiving device.

20 Claims, 5 Drawing Sheets

DISTRIBUTED DIGITAL RIGHTS MANAGEMENT (DRM) PROTECTION

TECHNICAL FIELD

The present disclosure relates to digital rights management (DRM) processing, and in particular, DRM protection.

BACKGROUND

Digital rights management (DRM) systems generate encrypted content keys, which are used to protect DRM media content delivered to client systems. In various situations, a receiving device receives an encrypted content key, and processes (e.g., decrypts) the encrypted content key. The receiving device uses the decrypted content key in order to decrypt DRM media content. A DRM system often services multiple receiving devices. However, performing DRM processing at each of the multiple receiving devices introduces various networking challenges.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

In accordance with common practice, various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Disclosed herein are various embodiments of distributed DRM protection for multiple receiving devices. Namely, various embodiments include a DRM key protection system generating protected content keys, and providing the protected content keys to the multiple receiving devices. To that end, the DRM key protection system decrypts encrypted content keys from a DRM license system, protects the decrypted content keys, and provides the protected content keys to the multiple receiving devices. In turn, a receiving device may use a corresponding protected content key to decrypt DRM media content (e.g., multimedia content). The distributed nature of the DRM key protection system and the receiving devices enables greater network efficiency and reliability. For example, performing key decryption at the DRM key protection system rather than at the receiving devices reduces resource utilization by the receiving devices, and may increase network efficiency.

In some embodiments, the DRM key protection system receives the encrypted content keys after (e.g., in response to) performing hardware binding. For example, an identifier is bound to hardware of the DRM key protection system, such as a hardware identifier that identifies the DRM key protection system or identifies a hardware characteristic (e.g., hardware type) of the DRM key protection system. In some embodiments, the identifier is a trusted identifier (e.g., not compromised) associated with the DRM key protection system.

In some embodiments, the DRM key protection system receives encrypted content keys while the DRM key protection system has an active secure communication session with the DRM license system. In some embodiments, establishing the secure communication session may be accomplished via a hardware binding process. To that end, the DRM key protection system may transmit, to the DRM license system, a trusted identifier that is associated with the DRM key protection system. In turn the DRM license system validates the trusted identifier, and sends back an indication of the validation. Thus, in contrast to other systems in which hardware binding occurs on a per receiving device basis, various embodiments disclosed herein include performing hardware binding between the DRM license system and the DRM key protection system, independent of the number of receiving devices.

In accordance with some embodiments, a method is performed at a DRM key protection system including one or more processors, a non-transitory memory, and a network interface. The method includes receiving, from a DRM license system, a plurality of encrypted content keys respectively associated with a plurality of receiving devices. The plurality of encrypted content keys includes a first encrypted content key that is associated with a first receiving device of the plurality of receiving devices. The plurality of encrypted content keys also includes a second encrypted content key that is associated with a second receiving device of the plurality of receiving devices. The method includes processing the first encrypted content key to generate a first decrypted content key, and processing the second encrypted content key to generate a second decrypted content key. The method includes generating a first protected content key based on the first decrypted content key, and generating a second protected content key based on the second decrypted content key. The method includes providing the first protected content key to the first receiving device, and providing the second protected content key to the second receiving device.

In accordance with some embodiments, a DRM key protection system includes one or more processors, a non-transitory memory, and a network interface. The one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a network device, cause the network device to perform or cause performance of the operations of any of the methods described herein. In accordance with some embodiments, a network device includes means for performing or causing performance of the operations of any of the methods described herein. In accordance with some embodiments, an information processing apparatus, for use in a network device, includes means for performing or causing performance of the operations of any of the methods described herein.

Certain DRM architectures include multiple receiving devices, with each receiving device performing DRM processing (e.g., decrypting) of a corresponding encrypted content key. However, performing the DRM processing at each of the multiple receiving devices introduces various networking challenges, such as issues with network efficiency and network reliability (e.g., lack of redundancy). Moreover, DRM-specific issues may exist, such as the need to perform a separate hardware binding process for each of the multiple receiving devices.

By contrast, various embodiments described below provide more efficient DRM protection techniques.

Example Embodiments

FIGS. 1A-1E are block diagrams of examples of distributed DRM protection environments in accordance with some embodiments.

Figure 1A:
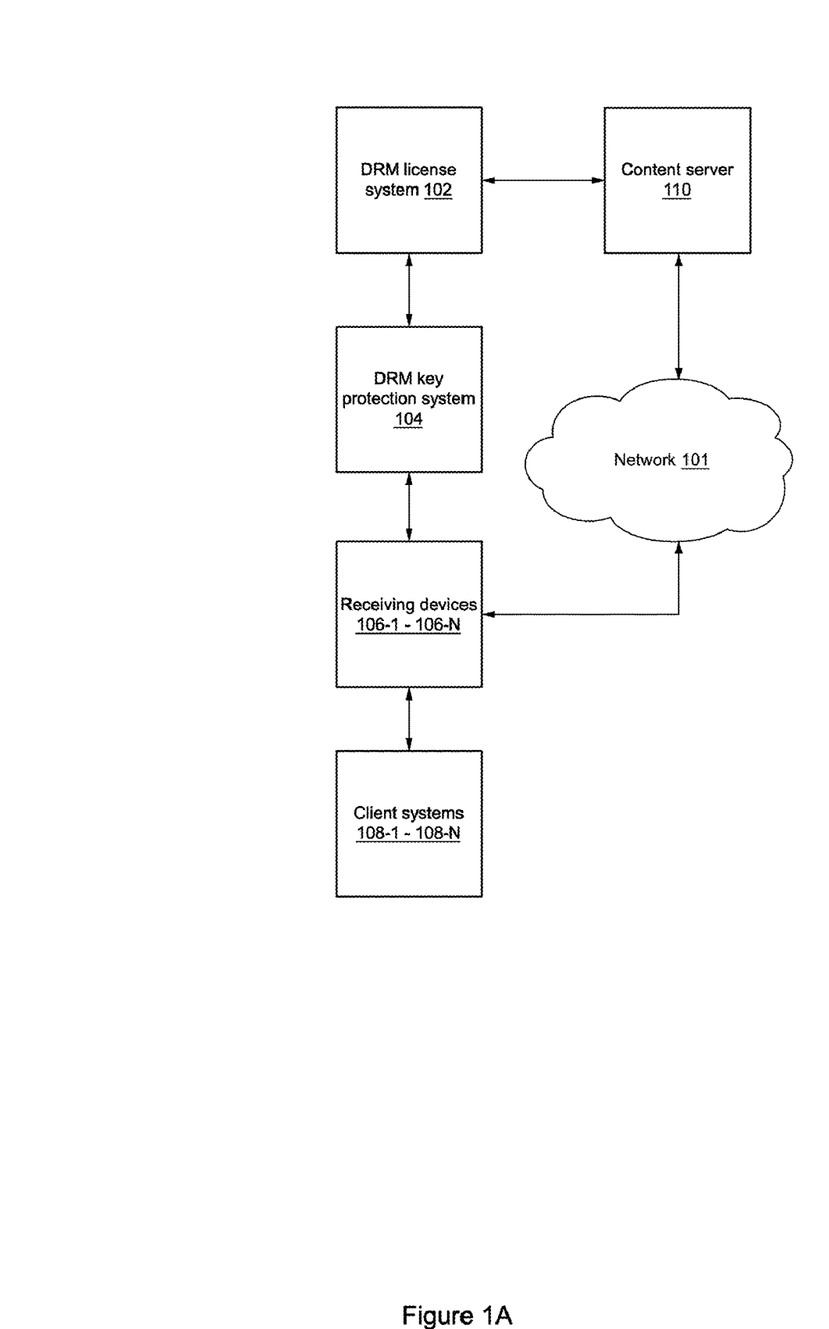
FIGS. 1A-1E are block diagrams of examples of distributed DRM protection environments in accordance with some embodiments.

As illustrated in FIG. 1A, a first distributed DRM protection environment 100a includes a network 101, a DRM license system 102, a DRM key protection system 104, a plurality of receiving devices 106-1-106-N, a plurality of client systems 108-1-108-N, and a content server 110. As will be described below, the DRM key protection system 104 enables distribution of a plurality of protected content keys to the plurality of receiving devices 106-1-106-N. Each of the plurality of receiving devices 106-1-106-N uses a corresponding protected content key to decrypt DRM media content, thereby enabling the DRM media content to be viewable on a display (e.g., after decoding and rendering).

The DRM license system 102 generates a plurality of encrypted content keys respectively associated with the plurality of receiving devices 106-1-106-N. Moreover, the DRM license system 102 provides the plurality of encrypted content keys to the DRM key protection system 104 for processing at the DRM key protection system 104 (described below). To that end, in some embodiments, the DRM license system 102 includes multiple key server modules (KSMs). For example, each of the KSMs generates one set of keys based on one type of seed. In some embodiments, the DRM license system 102 includes one or more storages for subscriber data (e.g., keys and/or entitlements, etc.) associated with users of the plurality of client systems 108-1-108-N.

In some embodiments, the DRM license system 102 generates an encrypted content key associated with a receiving device, based on an input parameter. For example, in response to successful authentication of a user of a client system (e.g., by an authenticator 150 of a first client system 108-1 in FIG. 1E), the client system obtains an input parameter, such as a key ID, content resolution, etc. included in encryption metadata. The encryption metadata may be included in a playlist (e.g., as a key tag value). The encryption metadata may be included in fragments, packets, and/or blocks of encrypted DRM media content delivered to the receiving device. The encryption metadata may alternatively be included in other data transfer means as will be appreciated by one ordinarily skilled in the art. The client system provides the input parameter to the receiving device, which, in turn, provides the input parameter to the DRM key protection system 104. For example, with reference to FIG. 1E, the first client system 108-1 includes a DRM controller 152 that sends an input parameter to the first receiving device 106-1. The DRM key protection system 104 provides the input parameter to the DRM license system 102, which uses the input parameter to generate the encrypted content key.

The DRM key protection system 104 processes the plurality of encrypted content keys, and provides the processed plurality of encrypted content keys to the plurality of receiving devices 106-1-106-N. For example, the DRM key protection system 104 decrypts an encrypted content key, protects the decrypted content key, and provides the protected content key to a receiving device. The protected content key enables the receiving device to decrypt DRM media content from a content server 110 (described below). In some embodiments, protection of a decrypted content key is based on a key ladder, which is associated with a corresponding receiving device.

The DRM key protection system 104 is separate from (e.g., not collocated with) each of the plurality of receiving devices 106-1-106-N. To that end, in some embodiments, the DRM key protection system 104 includes a network interface that enables communication with each of the plurality of receiving devices 106-1-106-N. Communication between the DRM key protection system 104 and a receiving device may proceed over a secure channel or an insecure channel (e.g., HTTP, WebRTC, etc.). In some embodiments, the DRM key protection system 104 resides at a network edge, away from the receiving devices 106-1-106-N each residing nearer to a respective client system. The DRM key protection system 104 operates within a secure processing environment, such as a trusted execution environment (TEE).

Based on a protected content key, a receiving device may decrypt DRM media content from the content server 110, in order to generate decrypted DRM media content. Moreover, the receiving device may process (e.g., decode and render) the decrypted DRM media content, and provide the processed decrypted DRM media content to a client system for display on a display of the client system.

Each of the plurality of receiving devices 106-1-106-N is associated with a corresponding one of the plurality of client systems 108-1-108-N. In some embodiments, a client system is integrated in a receiving device. For example, a receiving device corresponds to a mobile device (e.g., a smartphone), and a client system corresponds to an application running on the mobile device. In some embodiments, the client system is not integrated in a receiving device. For example, a receiving device corresponds to a television, and the client system is included in an adapter that interfaces with the television, such as a dongle that plugs into the television.

The content server 110 stores various DRM media content and delivers the DRM media content to the plurality of receiving devices 106-1-106-N via the network 101. The DRM media content may correspond to any type of multimedia data (e.g., video data, audio data). For example, the DRM media content includes a plurality of video frames, such as adaptive bitrate (ABR) video frames. The network 101 may correspond to a personal area network (PAN), wired local area network (LAN), wireless local area network (WLAN), wireless wide area networks (WWAN), etc. In some embodiments, the network 101 corresponds to a content delivery network (CDN).

In some embodiments, the content server 110 encodes DRM media content according to one or more protocols supported by a corresponding client system. For example, the one or more protocols include H.265, H.264 with a fragmented MPEG-4 (fMP4) data structure, MPEG-2, MPEG-1, Advanced Audio Coding (AAC), MP3, AC-3, etc.

In some embodiments, the content server 110 assembles the encoded DRM media content in preparation for the delivery to a client system. Moreover, the content server 110 may generate playlist(s) and/or metadata for encrypted DRM media content item prior to the delivery. For example, for a client system that consumes the media content items through a web browser, the content server 110 assembles the encoded DRM media content according to various streaming solutions, e.g., HTTP Live Streaming (HLS) or HTTP Smooth Streaming (HSS), etc., and generates encrypted DRM media content using a plurality of sets of keys from the DRM license system 102.

Figure 1B:
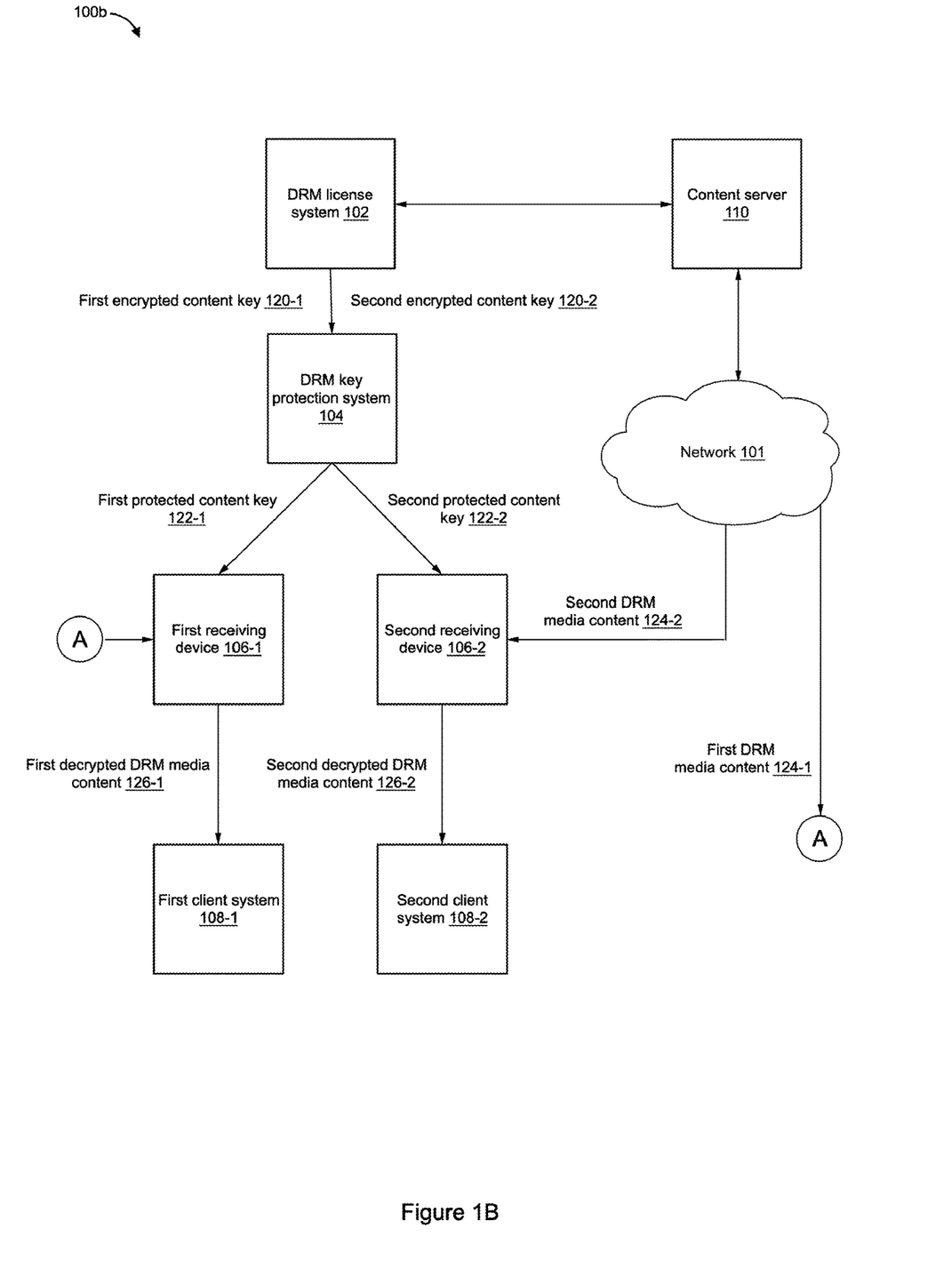

As illustrated in FIG. 1B, a second distributed DRM protection environment 100b includes the network 101, the DRM license system 102, the DRM key protection system 104, the first receiving device 106-1, the second receiving device 106-1, the first client system 108-1, the second client system 108-2, and the content server 110.

The content server 110 provides, via the network 101, first DRM media content 124-1 to the first receiving device 106-1. Moreover, the content server 110 provides, via the network 101, second DRM media content 124-2 to the second receiving device 106-2. Each of the first DRM media content 124-1 and the second DRM media content 124-2 is encrypted according to DRM protocols. The DRM key protection system 104 coordinates with the DRM license system 102 to provide respective protected content keys to enable decryption of respective DRM media content.

Namely, the DRM license system 102 generates a first encrypted content key 120-1 associated with the first receiving device 106-1, and generates a second encrypted content key 120-2 associated with the second receiving device 106-2. The DRM key protection system 104 receives, from the DRM license system 102, the first encrypted content key 120-1 and the second encrypted content key 120-2.

In some embodiments, the DRM key protection system 104 receives the first encrypted content key 120-1 and the second encrypted content key 120-2 while a secure communication session is active between the DRM key protection system 104 and the DRM license system 102. For example, with reference to FIG. 1C, the DRM key protection system 104 may include a secure communication session generator 130 that generates the secure communication session. In some embodiments, the secure communication session generator 130 establishes a secure communication session by performing a (one-to-one) hardware binding between the DRM key protection system 104 and the DRM license system 102.

In some embodiments, the DRM key protection system 104 receives the first encrypted content key 120-1 and the second encrypted content key 120-2 after performing hardware binding. For example, an identifier is bound to hardware of the DRM key protection system 104 system, such as a hardware identifier that identifies the DRM key protection system 104 or identifies a hardware characteristic (e.g., hardware type) of the DRM key protection system 104. In some embodiments, the identifier is a trusted identifier (e.g., not compromised) associated with the DRM key protection system 104.

The DRM key protection system 104 prepares the first encrypted content key 120-1 and the second encrypted content key 120-2 for delivery to the first receiving device 106-1 and the second receiving device 106-2, respectively. Preparing an encrypted content key includes processing (e.g., decrypting) the encrypted content key, and protecting the processed content key to generate a protected content key. For example, with reference to FIG. 1C, the DRM key protection system 104 may include a key decrypter 132 and a key protector 134 that together prepare an encrypted content key. Referring back to FIG. 1B, the key decrypter 132 decrypts the first encrypted content key 120-1 to generate a first decrypted content key, and the key protector 134 protects the first decrypted content key to generate a first protected content key 122-1. Moreover, the key decrypter 132 decrypts the second encrypted content key 120-2 to generate a second decrypted content key, and the key protector 134 protects the second decrypted content key to generate a second protected content key 122-2.

Figure 1C:
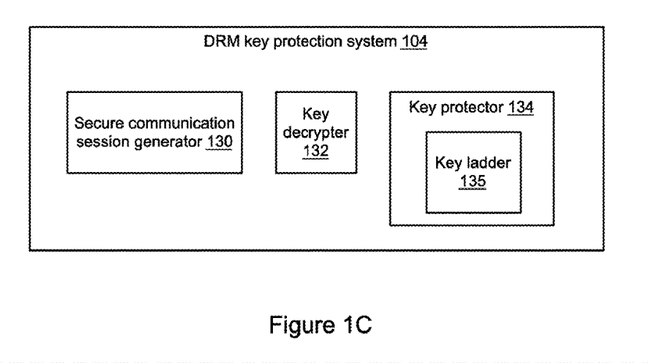

In some embodiments, referring to FIG. 1C, protecting a decrypted content key includes using a key ladder 135. For example, protecting the first decrypted content key is based on a first ladder key that is associated with the first receiving device 106-1, and protecting the second decrypted content key is based on a second ladder key that is associated with the second receiving device 106-2. A key ladder may be a generic cryptographic construction, and may include chaining keyed cryptographic operations such that each one of those operations gets its key from the output of a previous operation. The final level of the key ladder typically outputs its result out of the key ladder for general use, e.g., for decrypting the encrypted content, and the intermediate levels generate varying levels of intermediate key ladder keys, e.g., as provided by different entities and/or is project specific.

Referring back to FIG. 1B, the DRM key protection system 104 provides the first protected content key 122-1 to the first receiving device 106-1, and provides the second protected content key 122-2 to the second receiving device 106-2.

The first protected content key 122-1 enables the first receiving device 106-1 to decrypt the first DRM media content 124-1. For example, with reference to FIGS. 1B and 1D, the first receiving device 106-1 includes a DRM media content decrypter 140 that decrypts the first DRM media content 124-1 using the first protected content key 122-1, in order to generate first decrypted DRM media content 126-1. The first receiving device 106-1 may provide the first decrypted DRM media content 126-1 to the first client system 108-1, for display on a display 154 of the first client system 108-1 (illustrated in FIG. 1E). In some embodiments, the first client system 108-1 prepares (e.g., decodes and renders) the first decrypted DRM media content 126-1 for display on its display 154.

The second protected content key 122-2 enables the second receiving device 106-2 to decrypt the second DRM media content 124-2. For example, with reference to FIG. 1B, the second receiving device 106-2 decrypts the second DRM media content 124-2 using the second protected content key 122-2, in order to generate second decrypted DRM media content 126-2. The second receiving device 106-2 may provide the second decrypted DRM media content 126-2 to the second client system 108-2, for display on a display of second client system 108-2. In some embodiments, the second client system 108-2 prepares (e.g., decodes and renders) the second decrypted DRM media content 126-2 for display on its display.

In some embodiments, a receiving device prepares decrypted DRM media content for display on a display of a corresponding client system. For example, with reference to FIG. 1D, the first receiving device 106-1 may include a DRM media content decoder 142 that decodes the first decrypted DRM media content, and may include a DRM media content renderer 144 that renders the decoded DRM media content. Continuing with this example, the first receiving device 106-1 provides the rendered DRM media content to the first client system 108-1, for direct display (e.g., with minimal or no processing) on the display 154. Thus, in some embodiments, rather than having a client system decode/render decrypted DRM media content, a receiving device may decode/render the decrypted DRM media content.

Figure 1D:
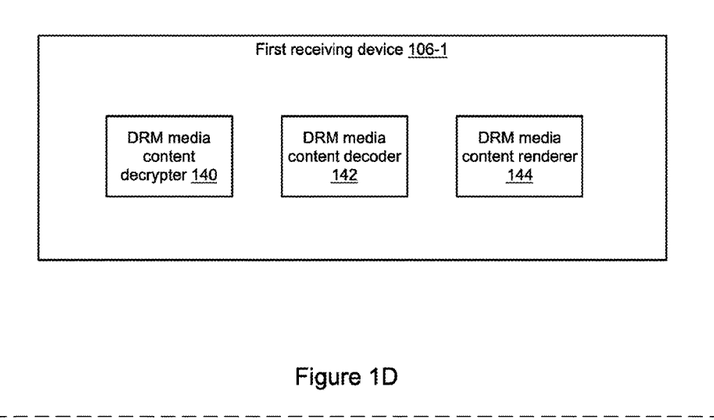
Figure 1E:
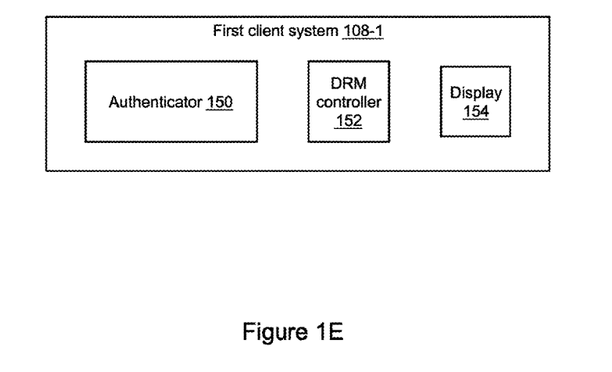

One of ordinary skill in the art will appreciate that the second receiving device 106-2 may also include one or more of a DRM media content decrypter, a DRM media content decoder, and a DRM media content renderer, with respective functionalities similar to those of the first receiving device 106-1 described with reference to FIG. 1D.

Figure 2:
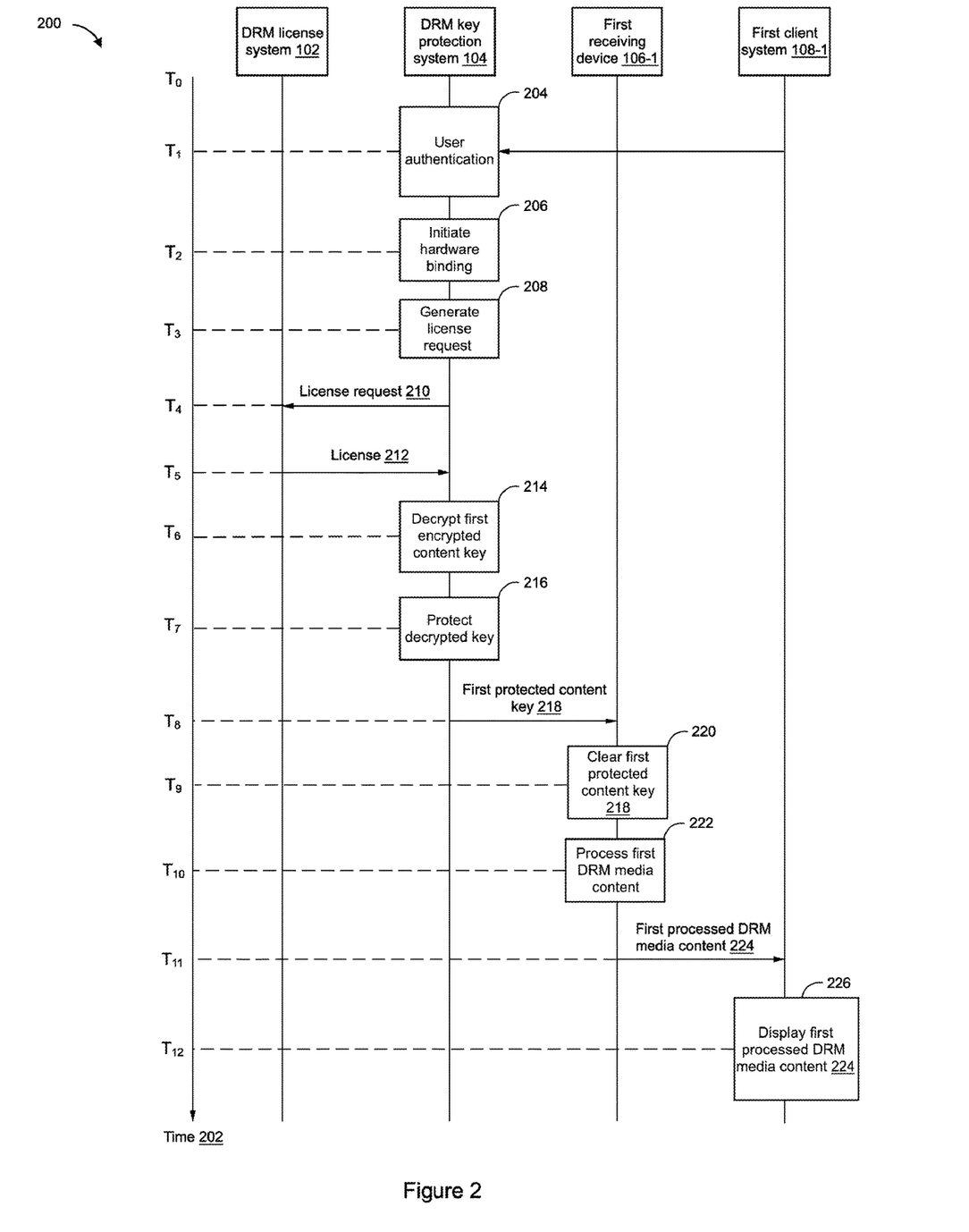
FIG. 2 is a timeline representation of a method of generating a protected content key, and providing the protected content key in accordance with some embodiments.

FIG. 2 is a timeline representation 200 of a method of generating a protected content key, and providing the protected content key in accordance with some embodiments. Although the description of the timeline representation 200 includes the DRM key protection system 104 providing a first protected content key 218 to the first receiving device 106-1, one of ordinary skill in the art will appreciate that the DRM key protection system 104 may generate additional protected content keys, and provide them to respective receiving devices.

As illustrated in FIG. 2, a current time indicator 202 indicates the passage of time, starting at an initial time $T_0$.

At a first time $T_1$, as represented by block 204, the DRM key protection system 104 receives an indication of user authentication of a user of the first client system 108-1. For example, with reference to FIG. 1E, the authenticator 150 of the first client system 108-1 authenticates the identity of a user (e.g., whether the user has subscribed to a service in order to login to an application), and accordingly provides an authentication indicator to the DRM key protection system 104.

At a second time $T_2$, as represented by block 206, the DRM key protection system 104 initiates a hardware binding with the DRM license system 102. In some embodiments, performing the hardware binding establishes a secure communication system between the DRM key protection system 104 and the DRM license system 102. The hardware binding process is represented by blocks 208-212.

In some embodiments, rather than performing hardware binding via a secure communication system (as described with reference to block 206), the binding is to hardware of the DRM key protection system 104. For example, an identifier is bound to hardware of the DRM key protection system 104, such as a hardware identifier that identifies the DRM key protection system 104 or identifies a hardware characteristic (e.g., hardware type) of the DRM key protection system 104. In some embodiments, the identifier is a trusted identifier (e.g., not compromised) associated with the DRM key protection system 104.

At a third time $T_3$, as represented by block 208, the DRM key protection system 104 generates a license request. The license request may include a trusted identifier. The trusted identifier is associated with (e.g., identifies) the DRM key protection system 104, which is in contrast to other DRM architectures in which a trusted identifier may be associated with a receiving device.

At a fourth time $T_4$, the DRM key protection system 104 provides a license request 210 to the DRM license system 102. In response to receiving the license request 210, the DRM license system 102 validates the identity of the DRM key protection system 104, which may include determining that the DRM key protection system 104 is a known and trusted system.

At a fifth time $T_5$, in response to validating the identity of the DRM key protection system 104, the DRM license system 102 provides a license 212 to the DRM key protection system 104. In some embodiments, the license 212 includes a first encrypted content key, which may be bound by the trusted identifier. In some embodiments, the DRM license system 102 further provides, to the DRM key protection system 104, a validation indicator that indicates validation of the trusted identifier.

At a sixth time $T_6$, as represented by block 214, the DRM key protection system 104 decrypts the first encrypted content key, to generate a first decrypted content key.

At a seventh time $T_7$, as represented by block 216, the DRM key protection system 104 protects the first decrypted content key, to generate a first protected content key 218. For example, the DRM key protection system 104 protects the first decrypted content key based on a first ladder key that is associated with the first receiving device 106-1. At an eighth time $T_8$, the DRM key protection system 104 provides the first protected content key 218 to the first receiving device 106-1.

The first protected content key 218 enables the first receiving device 106-1 to decrypt DRM media content (e.g., the first DRM media content 124-1 described with reference to FIG. 1B). To that end, in some embodiments, the first receiving device 106-1 clears the first protected content key 218 to generate a first cleared key, as represented by block 220 (at a ninth time $T_9$). For example, the first receiving device 106-1 clears the first protected content key 218 based on the first ladder key.

At a tenth time $T_{10}$, as represented by block 222, the first receiving device 106-1 may process first DRM media content to generate first processed DRM media content 224. For example, processing the first DRM media content may include decrypting the first DRM media content based on the first cleared key. As another example, processing the first DRM media content may further include decoding or rendering the decrypted first DRM media content.

At an eleventh time $T_{11}$, the first receiving device 106-1 provides the first processed DRM media content 224 to the first client system 108-1. At a twelfth time $T_{12}$, as represented by block 226, the first client system 108-1 displays the first processed DRM media content 224 on a display of the first client system 108-1.

Figure 3:
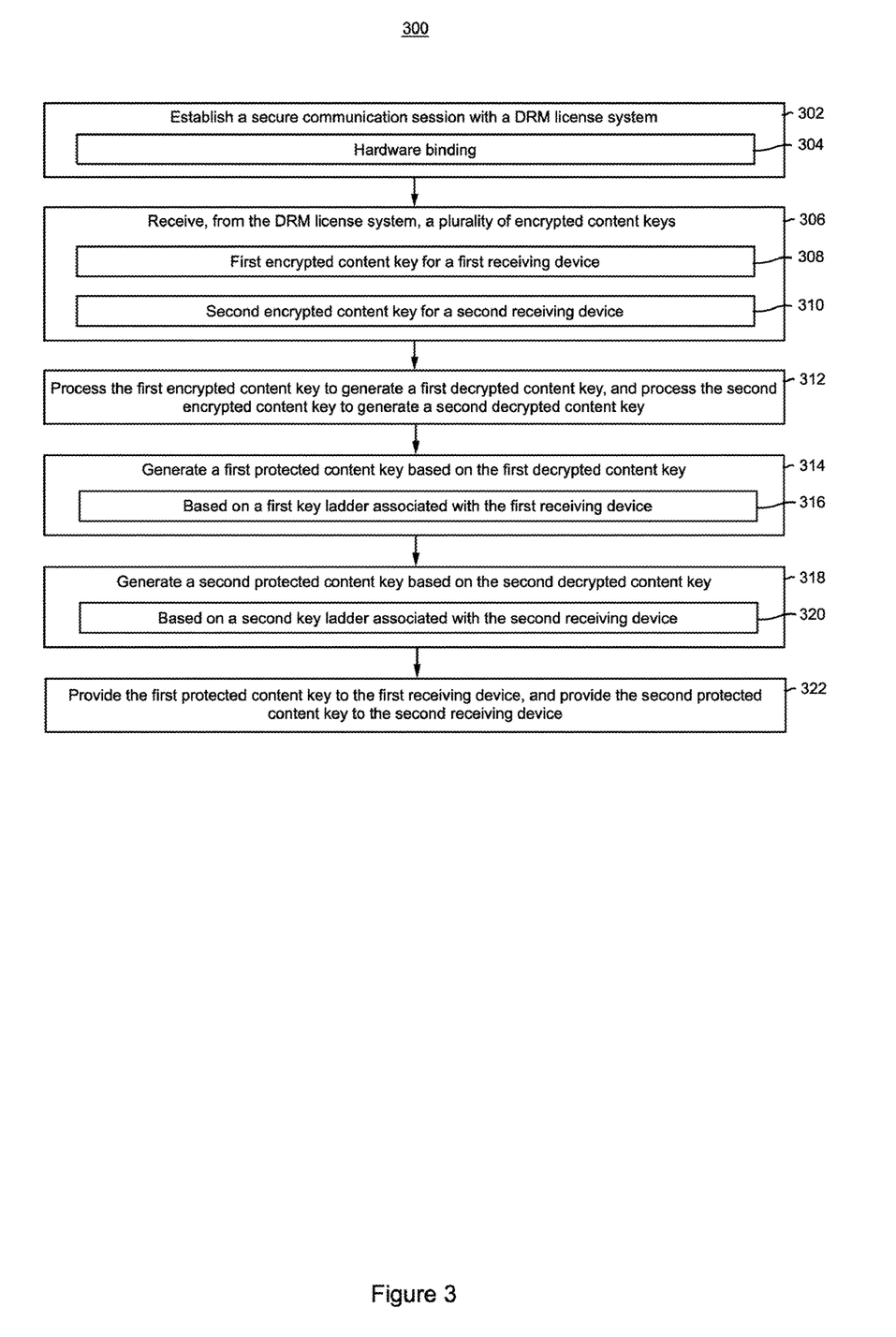
FIG. 3 is an example of a flow diagram of a method of distributing protected content keys to respective receiving devices in accordance with some embodiments.

FIG. 3 is an example of a flow diagram of a method 300 of distributing protected content keys to respective receiving devices in accordance with some embodiments. In some embodiments, the method 300 or portions thereof is performed by a DRM key protection system, such as the DRM key protection system 104 described with reference to FIGS. 1A-1C and 2. In some embodiments, the DRM key protection system key protection system operates within a secure processing environment, such as a trusted execution environment (TEE). In some embodiments, the method 300 or portions thereof is performed by a controller that is integrated in a network device. In some embodiments, the method 300 or portions thereof is performed by an apparatus with one or more processors, a non-transitory memory, and a network interface.

As represented by block 302, in some embodiments, the method 300 includes establishing a secure communication session with a DRM license system. For example, with reference to FIG. 1A, the DRM key protection system 104 establishes a secure communication session with the DRM license system 102. As represented by block 304, in some embodiments, establishing the secure communication session includes performing a hardware binding between the DRM key protection system 104 and the DRM license system 102, such as is described with reference to blocks 206-212 of FIG. 2. Thus, in contrast to other DRM architectures in which hardware binding occurs on a per receiving device basis, the method 300 may include performing hardware binding between the DRM license system and the DRM key protection system, independent of the number of receiving devices. Accordingly, the method 300 may provide DRM protection with less utilization of network resources. In some embodiments, the DRM key protection system establishes a secure communication session by transmitting a trusted identifier to the DRM license system, and receiving back from the DRM license system a validation indicator that indicates validation of the trusted identifier.

In some embodiments, rather than performing hardware binding via a secure communication system (as described with reference to block 304), the binding is to hardware of the DRM key protection system 104. For example, an identifier is bound to hardware of the DRM key protection system 104, such as a hardware identifier that identifies the DRM key protection system 104 or identifies a hardware characteristic (e.g., hardware type) of the DRM key protection system 104. In some embodiments, the identifier is a trusted identifier (e.g., not compromised) associated with the DRM key protection system 104.

As represented by block 306, the method 300 includes receiving, from a DRM license system, a plurality of encrypted content keys respectively associated with a plurality of receiving devices. In some embodiments, receiving the plurality of encrypted content keys occurs while the DRM key protection system has an active secure communication session with the DRM license system.

As represented by block 308, the plurality of encrypted content keys includes a first encrypted content key that is associated with a first receiving device of the plurality of receiving devices. For example, the first encrypted content key corresponds to the first encrypted content key 120-1 illustrated in FIG. 1B. As represented by block 310, the plurality of encrypted content keys includes a second encrypted content key that is associated with a second receiving device of the plurality of receiving devices. For example, the second encrypted content key corresponds to the second encrypted content key 120-2 illustrated in FIG. 1B.

As represented by block 312, the method 300 includes processing the first encrypted content key to generate a first decrypted content key, and processing the second encrypted content key to generate a second decrypted content key. For example, with reference to FIG. 1B, the DRM key protection system 104 processes the first encrypted content key 120-1 to generate a first decrypted content key, and processes the second encrypted content key 120-2 to generate a second decrypted content key.

As represented by block 314, the method 300 includes generating a first protected content key based on the first decrypted content key. Continuing with the previous example, the DRM key protection system 104 generates the first protected content key 122-1 based on the first decrypted content key. As represented by block 316, in some embodiments, generating the first protected content key is based on a first key ladder associated with the first receiving device.

As represented by block 318, the method 300 includes generating a second protected content key based on the second decrypted content key. Continuing with the previous example, the DRM key protection system 104 generates the second protected content key 122-2 based on the second decrypted content key. As represented by block 320, in some embodiments, generating the second protected content key is based on a second key ladder associated with the second receiving device.

As represented by block 322, the method 300 includes providing the first protected content key to the first receiving device, and providing the second protected content key to the second receiving device.

In some embodiments, the method 300 includes, at the first receiving device, obtaining first DRM media content, clearing the first protected key in order to generate a first cleared key, decrypting the first DRM media content using the first cleared key, in order to generate first decrypted DRM media content, and preparing the decrypted first DRM media content for playback on a display of a first client system. For example, with reference to FIG. 1B, the first receiving device 106-1 obtains the first DRM media content 124-1. Continuing with this example, the first receiving device 106-1 clears the first protected content key 122-1, and uses the cleared key to decrypt the first DRM media content 124-1. Moreover, the first receiving device 106-1 may prepare (e.g., decode and render) the decrypted first DRM media content 124-1 to make the resulting content viewable on a display of the first client system 108-1.

In some embodiments, the method 300 includes, at the second receiving device, obtaining second DRM media content, clearing the second protected key, in order to generate a second cleared key, decrypting the second DRM media content using the second cleared key, in order to generate second decrypted DRM media content, and preparing the decrypted second DRM media content for playback on a display of a second client system. For example, with reference to FIG. 1B, the second receiving device 106-2 obtains the second DRM media content 124-2. Continuing with this example, the second receiving device 106-2 clears the second protected content key 122-2, and uses the cleared key to decrypt the second DRM media content 124-2. Moreover, the second receiving device 106-2 may prepare (e.g., decode and render) the decrypted second DRM media content 124-2 to make the resulting content viewable on a display of the second client system 108-2.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be collocated or not collocated. The results of the disclosed methods and tasks may be persistently stored by transforming physical storage devices, such as solid-state memory chips and/or magnetic disks, into a different state.

The disclosure is not intended to be limited to the embodiments shown herein. Various modifications to the embodiments described in this disclosure may be readily apparent to those skilled in the art, and the generic principles defined herein may be applied to other embodiments without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at a digital rights management (DRM) key protection system including one or more processors, a non-transitory memory, and a network interface:
   receiving, from a first client system associated with a first receiving device of a plurality of receiving devices, an indication of a first user authentication by the first client system;
   receiving, from a second client system associated with a second receiving device of the plurality of receiving devices, an indication of a second user authentication by the second client system;
   receiving, from a DRM license system based on the first and second user authentications, a plurality of encrypted content keys respectively associated with the plurality of receiving devices, wherein the plurality of encrypted content keys includes a first encrypted content key that is associated with the first receiving device of the plurality of receiving devices, and wherein the plurality of encrypted content keys includes a second encrypted content key that is associated with the second receiving device of the plurality of receiving devices;
   decrypting the first encrypted content key to generate a first decrypted content key, and decrypting the second encrypted content key to generate a second decrypted content key;
   generating a first protected content key based on the first decrypted content key and a first key ladder associated with the first receiving device, and generating a second protected content key based on the second decrypted content key and a second key ladder associated with the second receiving device; and
   providing the first protected content key to the first receiving device to enable the first receiving device to decrypt content using the first protected content key and provide the decrypted content to the first client system, and providing the second protected content key to the second receiving device to enable the second receiving device to decrypt content using the second protected content key and provide the decrypted content to the second client system.

2. The method of claim 1, further comprising establishing a secure communication session with the DRM license system, wherein receiving the plurality of encrypted content keys occurs while the secure communication session is active.

3. The method of claim 2, wherein establishing the secure communication session includes:
   transmitting, to the DRM license system, a trusted identifier that is associated with the DRM key protection system; and
   receiving, from the DRM license system, a validation indicator that indicates validation of the trusted identifier.

4. The method of claim 2, wherein establishing the secure communication session with the DRM license system includes performing a hardware binding between the DRM key protection system and the DRM license system.

5. The method of claim 1, further comprising performing a hardware binding to a hardware identifier associated with the DRM key protection system, wherein receiving the plurality of encrypted content keys is in response to performing the hardware binding.

6. The method of claim 5, wherein the hardware identifier corresponds to a trusted identifier that identifies the DRM key protection system.

7. The method of claim 1, wherein the DRM key protection system is separate from each of the plurality of receiving devices, and wherein the DRM key protection system communicates with each of the plurality of receiving devices via the network interface.

8. The method of claim 1, wherein the first protected content key enables the first receiving device to decrypt first DRM media content, and wherein the second protected content key enables the second receiving device to decrypt second DRM media content.

9. The method of claim 1, wherein the DRM key protection system operates within a secure processing environment.

10. The method of claim 1, wherein each of the first and second key ladders includes chaining keyed cryptographic operations.

11. The method of claim 10, wherein chaining the keyed cryptographic operations includes:
    generating intermediate key ladders keys, and
    generating the first and second protected content keys based on the intermediate key ladders keys.

12. The method of claim 1, wherein receiving the first encrypted content key is in response to receiving the first indication of user authentication, and wherein receiving the second encrypted content key is in response to receiving the second indication of user authentication.

13. The method of claim 12, further comprising, in response to receiving the first indication of user authentication:
performing a hardware binding with the DRM license system to establish a secure channel with the DRM license system;
transmitting, to the DRM license system via the secure channel, a request for the first encrypted content key; and
receiving, from the DRM license system via the secure channel, the first encrypted content key.

14. A DRM key protection system comprising:
a network interface;
one or more processors; and
a non-transitory memory storing computer-readable instructions, which when executed by the one or more processors, cause the DRM key protection system to:
receive, from a first client system associated with a first receiving device of a plurality of receiving devices, an indication of a first user authentication by the first client system;
receive, from a second client system associated with a second receiving device of the plurality of receiving devices, an indication of a second user authentication by the second client system;
receive, from a DRM license system based on the first and second user authentications, a plurality of encrypted content keys respectively associated with plurality of receiving devices, wherein the plurality of encrypted content keys includes a first encrypted content key that is associated with the first receiving device of the plurality of receiving devices, and wherein the plurality of encrypted content keys includes a second encrypted content key that is associated with the second receiving device of the plurality of receiving devices;
decrypt the first encrypted content key to generate a first decrypted content key, and decrypt the second encrypted content key to generate a second decrypted content key;
generate a first protected content key based on the first decrypted content key and a first key ladder associated with the first receiving device, and generate a second protected content key based on the second decrypted content key and a second key ladder associated with the second receiving device; and
provide the first protected content key to the first receiving device to enable the first receiving device to decrypt content using the first protected content key and provide the decrypted content to the first client system, and provide the second protected content key to the second receiving device to enable the second receiving device to decrypt content using the second protected content key and provide the decrypted content to the second client system.

15. The DRM key protection system of claim 14, wherein the instructions, when executed by the one or more processors, cause the DRM key protection system to establish a secure communication session with the DRM license system, and wherein receiving the plurality of encrypted content keys occurs while the secure communication session is active.

16. The DRM key protection system of claim 15, wherein the establishment of the secure communication session with the DRM license system includes performing a hardware binding between the DRM key protection system and the DRM license system.

17. The DRM key protection system of claim 14, wherein the first protected content key enables the first receiving device to decrypt first DRM media content, and wherein the second protected content key enables the second receiving device to decrypt second DRM media content.

18. A non-transitory computer-readable medium that includes computer-readable instructions stored thereon, which, when executed by one or more processors, cause the one or more processors to perform operations comprising:
receiving, from a first client system associated with a first receiving device of a plurality of receiving devices, an indication of a first user authentication by the first client system;
receiving, from a second client system associated with a second receiving device of the plurality of receiving devices, an indication of a second user authentication by the second client system;
receiving, from a DRM license system based on the first and second user authentications, a plurality of encrypted content keys respectively associated with the plurality of receiving devices, wherein the plurality of encrypted content keys includes a first encrypted content key that is associated with the first receiving device of the plurality of receiving devices, and wherein the plurality of encrypted content keys includes a second encrypted content key that is associated with the second receiving device of the plurality of receiving devices;
decrypting the first encrypted content key to generate a first decrypted content key, and decrypting the second encrypted content key to generate a second decrypted content key;
generating a first protected content key based on the first decrypted content key and a first key ladder associated with the first receiving device, and generating a second protected content key based on the second decrypted content key and a second key ladder associated with the second receiving device; and
providing the first protected content key to the first receiving device to enable the first receiving device to decrypt content using the first protected content key and provide the decrypted content to the first client system, and providing the second protected content key to the second receiving device to enable the second receiving device to decrypt content using the second protected content key and provide the decrypted content to the second client system.

19. The non-transitory computer-readable medium of claim 18, wherein the operations comprise establishing a secure communication session with the DRM license system, and wherein receiving the plurality of encrypted content keys occurs while the secure communication session is active.

20. The non-transitory computer-readable medium of claim 18, wherein the operations comprise performing a hardware binding to a hardware identifier that identifies a DRM key protection system, and wherein receiving the plurality of encrypted content keys is in response to performing the hardware binding.

* * * * *